United States Patent [19]

Chao

[11] 4,447,351

[45] May 8, 1984

[54] PREPARATION OF ALUMINA HYDROSOL FROM ALUMINUM SULFATE SOLUTION

[75] Inventor: Tai-Hsiang Chao, Mt. Prospect, Ill.

[73] Assignee: UOP Inc., Des Plaines, Ill.

[21] Appl. No.: 457,547

[22] Filed: Jan. 12, 1983

[51] Int. Cl.³ .............................................. B01J 13/00
[52] U.S. Cl. ................................ 252/313 R; 423/627; 502/238; 502/355
[58] Field of Search ................ 252/315.7, 313 R, 442, 252/463; 423/627; 502/238, 355

[56] References Cited

U.S. PATENT DOCUMENTS

| | | | |
|---|---|---|---|
| 2,620,314 | 12/1952 | Hoekstra | 252/448 |
| 2,666,749 | 1/1954 | Hoekstra | 252/448 |
| 2,689,226 | 9/1954 | Hoekstra | 252/442 |
| 2,774,743 | 12/1956 | Hoekstra | 252/448 |
| 2,787,540 | 4/1957 | Appell | 75/108 |
| 3,020,242 | 2/1962 | McCartney et al. | 252/442 |
| 3,066,012 | 11/1962 | Wilson et al. | 23/143 |
| 3,183,194 | 5/1965 | Kuwata et al. | 252/317 |
| 3,330,774 | 7/1967 | Kuwata et al. | 252/359 |
| 3,535,268 | 10/1970 | Hayes | 252/313 R |
| 4,211,667 | 7/1980 | Yamada et al. | 252/313 R |

OTHER PUBLICATIONS

*Handbook of Chemistry and Physics,* 49th Ed., Chemical Rubber Company, Cleveland, Ohio, (1968–1969), p. B—307.

*Primary Examiner*—Richard D. Lovering
*Assistant Examiner*—Anne Brookes
*Attorney, Agent, or Firm*—James R. Hoatson, Jr.; Louis A. Morris; William H. Page, II

[57] ABSTRACT

The present invention relates to a method of preparing an alumina hydrosol from an aluminum sulfate solution. The subject method comprises the steps of admixing a stoichiometric amount of a metal selected from the group consisting of calcium, strontium and/or barium in the form of a mixture of a hydrated chloride metal salt and a metal hydroxide with an aqueous aluminum sulfate solution, filtering the resulting metal sulfate precipitate from the above admixture, recovering a substantially sulfur-free aluminum-containing filtrate solution, admixing aluminum metal with the filtrate solution, and digesting the aluminum metal at digestion conditions with the filtrate solution to form an alumina hydrosol possessing the desired Al:Cl weight ratio.

7 Claims, No Drawings

PREPARATION OF ALUMINA HYDROSOL FROM ALUMINUM SULFATE SOLUTION

BACKGROUND OF THE INVENTION

The present invention relates to a method of preparing alumina hydrosol from an aluminum sulfate solution (alum solution). Alumina hydrosol is a well-known starting material for the preparation of alumina and alumina-containing refractory oxide composites such as alumina-silica. Such refractory oxides are useful as adsorbents and particularly as catalysts or catalyst supports. The general technique of preparing alumina hydrosols by digesting aluminum metal in a mineral acid is well documented in the literature and prior art; with respect to hydrosol preparation, as well as other aspects of alumina manufacture; the reader's attention is directed to U.S. Pat. Nos. 2,620,314, 2,666,749, 2,689,226, 2,774,743, and 3,020,242 for a thorough background of the subject matter.

As the cost of the aluminum metal used in the hydrosol preparation method becomes more expensive the use of relatively inexpensive aluminum salts to substitute for aluminum metal becomes an economically attractive alternative.

Large quantities of aluminum sulfate are produced as a by-product of spent catalyst metals recovery processes. U.S. Pat. No. 2,787,540, for instance, discloses a spent catalyst metals recovery process wherein a deactivated alumina platinum catalyst is treated with sulfuric acid which results in the formation of aluminum sulfate as a by-product. In view of the existence of this relatively inexpensive source of aluminum there has been a heretofore unfulfilled long felt demand to utilize this source in the manufacture of acidic aluminum hydrosols.

Accordingly, it would be economically desirable to recycle the by-product aluminum sulfate to an alumina hydrosol from which hydrosol may be employed to produce alumina or alumina-containing compositions.

U.S. Pat. No. 3,066,012 teaches a process for preparing alumina gels from alum solutions wherein an aqueous slurry of calcium carbonate is added to the alum solution, a resulting basic aluminum sulfate hydrosol is recovered, and an alumina gel is formed by adding sodium carbonate to the basic aluminum sulfate hydrosol.

In contradistinction to the above-described process the method of the present invention recovers the aluminum from an alum solution in the form of an acidic alumina hydrosol which hydrosol is substantially free of sulfate impurities.

SUMMARY OF THE INVENTION

Briefly in accordance with the present invention, an alumina hydrosol is prepared from an aluminum sulfate solution via a method which comprises the steps of admixing a stoichiometric amount of a metal selected from the group consisting of calcium, strontium and/or barium in the form of a mixture of a hydrated chloride metal salt and a metal hydroxide with the aqueous aluminum sulfate solution, filtering the resulting metal sulfate precipitate from the above admixture, recovering a substantially sulfur-free aluminum-containing filtrate solution, admixing aluminum metal with the filtrate solution, and digesting the aluminum metal at digestion conditions with the filtrate solution to form an alumina hydrosol possessing the desired Al:Cl weight ratio.

DETAILED DESCRIPTION OF THE INVENTION

The present invention may be carried out by employing a stoichiometric amount of a metal selected from the group consisting of calcium, strontium, and/or barium, in the form of a mixture of a hydrated chloride metal salt and a metal hydroxide. For the sake of clarity and brevity the further description of this invention is confined to the preferred metal, namely calcium.

Calcium sulfate has a solubility product of only $2.45 \cdot 10^{-5} M^2$ in an aqueous solution and is thus considered not soluble at room temperature. Therefore, the addition of calcium salts to aluminum sulfate solution provides an ideal method for removing sulfate ions without precipitating the aluminum ions.

Accordingly, several calcium salts were investigated with regard to their efficacy in removing sulfate ions from an alum solution via calcium sulfate precipitation. When calcium salts are reacted with aluminum sulfate, calcium sulfate, of course, is precipitated and the aluminum salt which remains is a function of the anion of the calcium salt which was added.

Calcium carbonate addition to the aluminum sulfate solution results in the generation of $CO_2$ gas and an increase in the pH of the alum solution. As the pH of the alum solution increases and reaches a value greater than about 3, a gelatinous insoluble aluminum carbonate species forms. This aluminum carbonate precipitate forms at the elevated pH before all of the $CaCO_3$ required to convert all of the sulfate to calcium sulfate has been added. Hydrochloric acid must be added to the solution to form the soluble aluminum chloride species and permit the full stoichiometric amount of $CaCo_3$ to be added.

Calcium hydroxide addition to the aluminum sulfate solution results in a similar phenomenon, in that a gelatinous $Al(OH)_3$ material forms coupled with an increase in the pH before half of the stoichiometric amount of calcium hydroxide required can be added. Large amounts of HCl have to be added to form the soluble aluminum chloride species.

Calcium chloride ($CaCl_2.2H_2O$) is very soluble in the aqueous aluminum sulfate solution and calcium sulfate precipitates immediately with no gelatinous materials forming. Further, the pH of the aluminum sulfate solution upon calcium chloride addition remains below 1. However, due to the stoichiometric amount required for calcium chloride addition the high concentration of chloride ion remaining in the filtrate solution results in an undesirable very low aluminum/chloride weight ratio. A low aluminum/chloride weight ratio in the filtrate solution requires the addition of a greater amount of aluminum metal to achieve the desired aluminum/chloride weight ratio in the finally prepared alumina hydrosol. The low aluminum/chloride weight ratio in the filtrate thereby results in a low level of alum solution utilization. Alum solution utilization is defined as the percentage of aluminum in the hydrosol that is derived from the alum solution.

As can be discerned from the above discussion, the use of the mentioned calcium salts in an effort to effect $CaSO_4$ precipitation has several drawbacks i.e. the formation of carbonates and hydroxides requiring the addition of HCl in the case of $CaCO_3$ and $Ca(OH)_2.2H_2O$ utilization, and the low aluminum to chloride ratio obtained when $CaCl_2.2H_2O$ is used.

The method of the present invention results from the discovery that a mixture of $CaCl_2.2H_2O$ and $Ca(OH)_2$ can be utilized to effect $CaSO_4$ precipitation wherein greater than 98% of the sulfate can be removed from the alum solution, and also that once the sulfur is removed the aluminum to chloride ratio of the solution can be adjusted so that the solution may be used to prepare an acceptable alumina hydrosol.

In accordance with the method of the invention, a stoichiometric amount of Ca is admixed with the alum solution. The calcium is in the form of a mixture of calcium chloride and calcium hydroxide. The useful proportion of the components in the mixture ranges from a $CaCl_2.2H_2O:Ca(OH)_2$ molar ratio of from 100:1 to 25:75. The preferred range for the $CaCl_2.2H_2O$:$Ca(OH)_2$ molar ratio is from 100:1 to 40:60. The optimum range for the $CaCl_2.2H_2O:Ca(OH)_2$ molar ratio is from 80:20 to 50:50.

After the $CaCl_2.2H_2O:Ca(OH)_2$ mixture is added to the alum solution a $Ca(SO_4)$ precipitate is formed. This $Ca(SO_4)$ precipitate is subsequently filtered from the substantially sulfur-free aluminum-containing filtrate solution.

The substantially sulfur-free aluminum-containing filtrate solution is subsequently employed in the preparation of an alumina hydrosol. By "substantially sulfur-free" it is meant that the aluminum-containing filtrate solution contains less than 1 wt. % sulfur.

An alumina hydrosol is typically prepared by digesting aluminum in aqueous hydrochloric acid and/or aluminum chloride solution at about reflux temperature ranging from 80° to about 150° C., and reducing the chloride anion concentration of the resulting aluminum chloride solution by the device of maintaining an excess of the aluminum reactant in the reaction mixture of a neutralizing agent. Preferably, the alumina hydrosol is an aluminum chloride hydrosol variously referred to as an aluminum oxychloride hydrosol, aluminum hydroxychloride hydrosol, and the like such as is formed when utilizing aluminum metal as a neutralizing agent in conjunction with an aqueous aluminum chloride solution. In any case, the aluminum chloride hydrosol is prepared to contain aluminum in from about a 0.70:1 to about 1.5:1 weight ratio with the chloride anion content thereof. The digestion may be carried out for a period of time ranging from 3 to 24 hours.

The above-described acidic alumina hydrosol is distinct from the basic alumina sulfate sol recovered as a filtrate in U.S. Pat. No. 3,066,012. In U.S. Pat. No. 3,066,012 calcium carbonate is added to the alum solution until a pH not exceeding 3.5 is obtained. A calcium sulfate precipitate forms which precipitate is then separated from the remaining basic aluminum sulfate sol.

In accordance with the present invention, a predetermined amount of aluminum metal to achieve the desired aluminum to chloride weight ratio is added to the above-described aluminum chloride filtrate solution. The aluminum chloride filtrate solution containing the additional aluminum metal is then digested at a temperature of from 80° to 150° C. for a period of time ranging from 3 to 24 hours.

The digestion process involves two reactions; formation of alumina hydrosol accompanied by evolution of hydrogen and hydrolysis of the aluminum salt. Progress of the reactions is followed by the quantity of hydrogen evolved during the digestion, as well as by analysis of the sol. An excess of aluminum metal is preferably maintained in the digester at all times. When the digester contents reach the desired composition, the batch of alumina hydrosol is transferred into a storage tank to await further processing into dropped, dried and calcined alumina spheres. For continuous digestion, aluminum, acid and water are substantially continuously added to the digester, the composition of the sol is maintained constant at final specifications, and a stream of finished hydrosol is continuously withdrawn from the digester.

The following example is presented in illustration of this invention and is not intended as an undue limitation on the generally broad scope of the invention as set out in the appended claims.

EXAMPLE I

The appended Table I sets out the analysis of 3 alumina hydrosols prepared from 3 separate alum solution batches in accordance with the method of the invention. Also, set out in Table I is the analysis of the initial alum solution employed and the analysis of the aluminum-containing filtrate solutions remaining after the calcium sulfate precipitate was filtered therefrom.

Note that three different stoichiometric mixtures of $CaCl_2.2H_2O$ and $Ca(OH)_2$ compounds were employed, resulting in different percentages of alum solution utilization. The percentage alum solution utilized is defined as the percentage of aluminum in the hydrosol that was derived from the alum solution. The example clearly shows that there is a significant economic advantage to recycling the alum solution to an alumina hydrosol. The example further shows that the process results in a substantially sulfur-free hydrosol, the presence of sulfur being deleterious to any further end uses i.e. catalyst, catalyst carrier of the alumina hydrosol. Finally, it should be noted that the hydrosol also contains an insignificant amount of calcium. The subject hydrosol relatively impurity-free is an excellent precursor for the preparation of alumina or alumina containing materials.

TABLE I

| Initial Alum Solution | | | |
|---|---|---|---|
| Weight Used, G | 2486 | 2591 | 2610 |
| Al, wt. % | 3.86 | 3.86 | 3.86 |
| $SO_4^{2-}$, wt. % | 21.1 | 21.1 | 21.1 |
| pH | 0.68 | 0.68 | 0.68 |
| Mole Ratio of $CaCl_2.2H_2O:Ca(OH)_2$ | 90:10 | 65:35 | 50:50 |
| Filtrate (Low Conc. Al Sol) | | | |
| Weight, G | 2170 | 2313 | 2195 |
| Al, wt. % | 3.74 | 3.96 | 3.7 |
| Cl, wt. % | 13.11 | 9.9 | 7.22 |
| $SO_4^{2-}$, wt. % | 0.43 | 1.5 | 1.62 |
| Ca, wt. % | 0.46 | 0.52 | 1.2 |
| Fe, ppm | 250 | 280 | 294 |
| Na, ppm | 25 | 35 | 68 |
| pH | 1.5 | 2.42 | 2.5 |
| Al:Cl wt. Ratio | 0.285 | 0.4 | 0.51 |
| % Sulfur Removal | 98.2 | 94 | 94 |
| Al Metal Digestion (Conc. Al Sol) | | | |
| Weight, G | 2296 | 1928 | 1235 |
| Al, wt. % | 12.75 | 12.57 | 13.76 |
| Cl, wt. % | 12.04 | 11.55 | 11.94 |
| $SO_4^{2-}$, wt. % | 0.45 | 1.49 | NA |
| Ca, wt. % | 0.39 | 0.59 | 1.4 |
| Fe, ppm | 120 | 223 | 196 |
| Na, ppm | 23 | 53 | 93 |
| Al:Cl Ratio | 1.06 | 1.09 | 1.15 |
| % Alum Utilization | 28 | 38 | 48 |

I claim as my invention:

1. Method of preparing an acidic, substantially sulfur-free alumina hydrosol from an aqueous aluminum sulfate solution which comprises the steps of:
   a. admixing about a stoichiometric amount of M where M is selected from the group consisting of Ca, Sr, and Ba in the form of a mixture of $MCl_2.2H_2O$ and $M(OH)_2$ with said aqueous aluminum sulfate solution, said amount of M being sufficient to precipitate in excess of 98% of the sulfate radical of said solution;
   b. filtering the resulting $M(SO_4)$ precipitate; recovering a substantially sulfur-free aluminum-containing filtrate solution; admixing sufficient aluminum metal with said filtrate solution to achieve a desired Al:Cl weight ratio in the so formed admixture; and
   c. digesting said admixture at digestion conditions to form said alumina hydrosol.

2. The method of claim 1 wherein the $MCl_2.2H_2O:M(OH)_2$ molar ratio of step (a) ranges from 100:1 to 25:75.

3. The method of claim 1 wherein the $MCl_2.2H_2O:M(OH)_2$ molar ratio of step (a) ranges from 100:1 to 40:60.

4. The method of claim 1 wherein the $MCl_2.2H_2O:M(OH)_2$ molar ratio of step (a) ranges from 80:20 to 50:50.

5. The method of claim 1 wherein M is Ca.

6. The method of claim 1 wherein the digesting step is carried out at a temperature of from 80° C. to 150° C. for a time period of from 3 to 24 hours.

7. The method of claim 1 wherein the Al:Cl weight ratio of said alumina hydrosol ranges from 0.70:1 to 1.5:1.

* * * * *